United States Patent
Frysz et al.

(10) Patent No.: US 6,759,163 B2
(45) Date of Patent: Jul. 6, 2004

(54) MISMATCHED COMPRESSION GLASS-TO-METAL SEAL

(75) Inventors: Christine A. Frysz, New Milford, CT (US); Harvey A. Hornung, II, Clarence, NY (US); Joseph M. Prinzbach, North Tonawanda, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 505 days.

(21) Appl. No.: 09/847,678

(22) Filed: May 2, 2001

(65) Prior Publication Data

US 2001/0055716 A1 Dec. 27, 2001

Related U.S. Application Data

(60) Provisional application No. 60/202,015, filed on May 4, 2000.

(51) Int. Cl.⁷ .................................. H01M 2/08
(52) U.S. Cl. ........................ 429/183; 429/181; 429/182; 429/184; 429/185
(58) Field of Search ................................. 429/171, 174, 429/181, 182, 184, 185, 186; 29/623.4, 623.2; 174/50.61, 50, 61; 607/36

(56) References Cited

U.S. PATENT DOCUMENTS

| | | | |
|---|---|---|---|
| 3,225,132 A | 12/1965 | Baas et al. | 174/151 |
| 3,803,875 A | 4/1974 | Root et al. | 65/43 |
| 4,053,692 A | 10/1977 | Dey | 429/171 |
| 4,421,947 A | 12/1983 | Kyle | 174/152 |
| 4,430,376 A | 2/1984 | Box | 428/174 |
| 4,436,955 A | 3/1984 | Kyle | 174/152 |
| 4,456,786 A | 6/1984 | Kyle | 174/152 |
| 4,587,144 A | 5/1986 | Kellerman et al. | 428/36 |
| 4,915,719 A | 4/1990 | Saffari | 63/32.2 |

OTHER PUBLICATIONS

Azom.com, Azom metals, ceramics, polymers, an Engineers Resource. (no date available).*

* cited by examiner

Primary Examiner—Randy Gulakowski
Assistant Examiner—Monique Wills
(74) Attorney, Agent, or Firm—Michael F. Scalise

(57) ABSTRACT

A reverse mismatched compression glass-to-metal seal is described. In this seal, the coefficient of thermal expansion of the insulating glass is lower than that of the terminal lead and, the ferrule or casing body has a similar or higher coefficient of thermal expansion than that of the terminal lead.

32 Claims, 1 Drawing Sheet

MISMATCHED COMPRESSION GLASS-TO-METAL SEAL

CROSS-REFERENCE TO RELATED APPLICATION

The present application claims priority based on provisional application Serial No. 60/202,015, filed May 4, 2000.

BACKGROUND OF THE INVENTION

1. Field of the Invention

The present invention generally relates to the conversion of chemical energy to electrical energy and, more particularly, to a glass-to-metal seal (GMTS) for hermetically sealing an electrochemical cell. The glass-to-metal seal is considered critical because it hermetically isolates the internal environment of a component from the external environment to which the component is exposed. In electrochemical cells powering implantable medical devices, the GTMS hermetically seals the internal cell chemistry from the internal device environment.

2. Prior Art

The glass-to-metal seal of an electrochemical cell consists of a ferrule sleeve secured to an opening in the cell casing, such as in the lid or in the casing body itself. The ferrule supports an insulating glass in a surrounding relationship and the glass in turn seals around the perimeter of a terminal lead. The terminal lead extends from inside the cell to a position outside the casing, and serves as the lead for one of the cell electrodes. Typically the terminal lead is connected to the cathode current collector. The casing including the lid serves as the second terminal for the other electrode, typically the anode. This configuration is referred to as a case-negative design.

To construct a glass-to-metal seal, insulating glass is provided in a ring shape to fit inside the ferrule sleeve or inside an opening in the casing body in a closely spaced relationship. The insulating glass has a hole through its center that receives the terminal lead in a closely spaced relationship. These components are assembled and then heated in a furnace. This heating step causes the glass to soften and flow into intimate contact with the inside of the ferrule and with the perimeter of the terminal lead. When the assembly cools, the insulating glass is bonded to the ferrule and the terminal lead.

Glass-to-metal seals are defined by the coefficient of thermal expansion of the materials of construction. Conventional glass-to-metal seals fall into two main types. The first is a matched seal where the coefficient of thermal expansions of all of the materials of construction are reasonably similar. The other is referred to as a compression seal. In this type, the coefficient of thermal expansion of the ferrule sleeve or of the casing body is higher than that of the insulating glass while the coefficients of thermal expansion of the terminal lead and the insulating glass are substantially the same. Compression type glass-to-metal seals are shown in U.S. Pat. No. 3,225,132 to Baas et al., U.S. Pat. No. 4,053,692 to Dey, U.S. Pat. No. 4,430,376 to Box and U.S. Pat. No. 4,587,144 to Kellerman et al.

SUMMARY OF THE PRESENT INVENTION

The present invention is directed to a reverse mismatched compression glass-to-metal seal where the coefficient of thermal expansion of the insulating glass is less than that of the terminal lead and, the ferrule or casing body has a coefficient of thermal expansion which is substantially similar to or significantly greater than that of the terminal lead. Theoretically, seals made with a terminal lead having a coefficient of thermal expansion greater than the insulating glass should display stress levels that compromise hermiticity.

These and other objects of the present invention will become increasingly more apparent to those of ordinary skill in the art by reference to the following description and the appended drawings.

BRIEF DESCRIPTION OF THE DRAWINGS

FIG. 1 is a schematic view of an exemplary glass-to-metal seal having a ferrule supporting the insulating glass.

FIG. 2 is a schematic view of an exemplary glass-to-metal seal having the glass sealed directly to the casing.

DESCRIPTION OF THE PREFERRED EMBODIMENTS

A typical hermetic glass-to-metal seal consists of a terminal lead electrically isolated from a ferrule or the casing body by an insulating glass. The individual materials chosen for these applications are critical and must meet the following design criteria. First, the terminal lead must be corrosion resistant to the internal cell chemistry, be weldable and modifiable for attachment to the end users product, and have sufficient electrically conductivity for the particular cell design. Secondly, the insulating glass needs to be corrosion resistant to the internal cell chemistry, and have sufficient electrical resistivity for the particular cell design. Lastly, the ferrule or casing body must be corrosion resistant to the internal cell chemistry, have sufficient electrically conductivity for the particular cell design, and be weldable for secondary operations.

When these components are manufactured into a glass-to-metal seal, accomplished by assembling the components together followed by heating in a furnace, the resultant seal must also meet the following design criteria: the assembly must be hermetic, the insulating glass must exhibit acceptable visual characteristics, i.e., have no cracks that affect function, and there must be sufficient electrical resistivity between the ferrule or casing body and the terminal lead for the cell design. Also, the glass-to-metal seal must exhibit acceptable thermal resistant to secondary processing such as welding and it must be mechanically tolerant to secondary processing such as terminal lead bending.

Turning now to the drawings, FIGS. 1 and 2 show exemplary embodiments of glass-to-metal seals of both the conventional matched and compression types and of the mismatched type according to the present invention. As already discussed, it is not the specific configuration of the various components of the seals, but the materials of construction which delineates the prior art from the present invention seals.

As shown in FIG. 1, one exemplary embodiment of a glass-to-metal seal 10 consists of a casing 12 having an opening sized to receive a ferrule 14. The casing 12 can be the casing body itself or a lid secured to the open end of a container housing the electrode assembly (not shown), as is well known by those of ordinary skill in the art. The ferrule 14 is a cylindrically-shaped member hermetically secured to the casing in the opening, such as by welding. Preferably, the upper end of the ferrule is flush with the outer surface of the casing 12. The ferrule extends into the interior of the casing and supports an insulating glass 16 surrounding the perimeter of a terminal lead 18. The terminal lead 18 is coaxial with the ferrule and one end extends into the interior of the casing. This end is connected to one of the electrodes, typically the current collector (not shown) of the cathode electrode. The other end of the terminal lead 18 extends above the ferrule 14 and the outer surface of the casing 12 and provides for connection to one of the terminals of the load which the cell is intended to power.

The other lead of the cell is provided by the casing electrically connected to the anode electrode. This electrode configuration is referred to as a case-negative design. As is well known by those of ordinary skill in the art, the cell can also be provided in a case-positive configuration. In that case, the terminal lead 18 is connected to the anode current collector and the cathode electrode is electrically connected to the casing.

In any event, the glass must be sufficiently resistive to electrically segregate the casing 12 from the terminal lead 18 but be sealed to and between the ferrule 14 and the terminal lead. This sealing relationship must be sufficiently hermetic so that the cell is useful in applications such as powering implantable medical devices.

Figure 2:
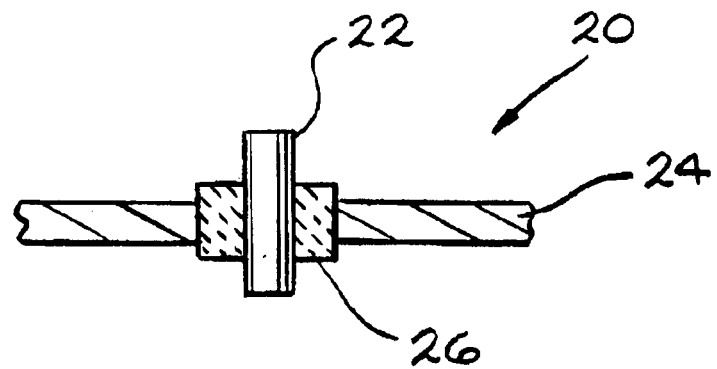

FIG. 2 shows another embodiment of an exemplary glass-to-metal seal 20 devoid of a ferrule. This assembly includes a terminal lead 22 sealed directly into an opening in the casing 24 by an intermediate insulating glass 26. Again, the casing can be the casing body itself or a lid for the casing, and the terminal lead is connected to the cathode while the casing serves as the anode terminal for a case-negative cell design.

Figure 1:
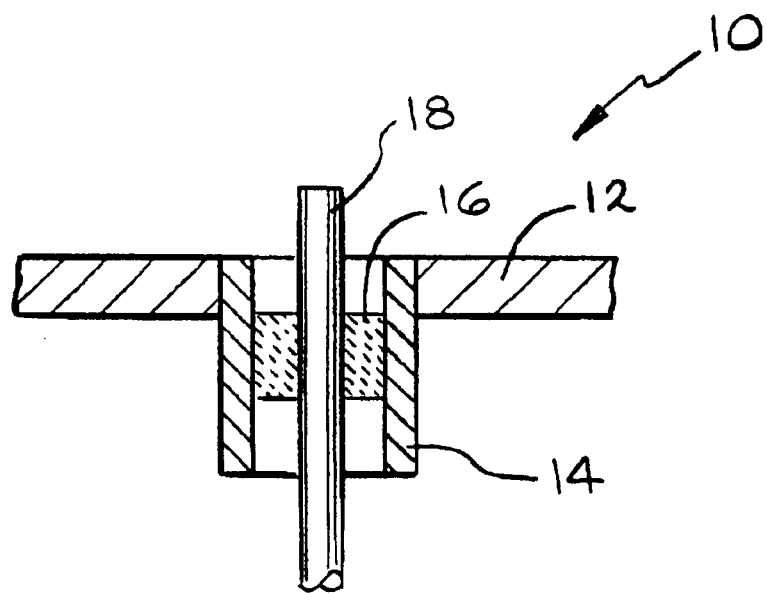

In that respect, the materials of construction for both the exemplary embodiments of glass-to-metal seals shown in FIGS. 1 and 2 must meet the various criteria set forth above. However, the present invention improves upon the hermeticity of the prior art seals by providing a glass-to-metal seal which is neither of a typical matched or compression type. Instead, the insulating glass of the present mismatched compression seal has a coefficient of thermal expansion which is less than, and preferably significantly less than, that of the terminal lead while the ferrule or casing body has a coefficient of thermal expansion which is substantially similar to or significantly greater than, that of the terminal lead. The resulting glass-to-metal seal is a compression seal with a terminal lead of mismatched thermal expansion. However, the resulting seal provides all of the critical design criteria for the use in an electrochemical cell of the type intended to power an implantable medical device.

A significantly less than or greater than coefficient of thermal expansion is one which differs from another by more than about $2.0 \times 10^{-6}/°C$. while a substantially similar coefficient of thermal expansion is defined as one which differs from another by less than about $\pm 2.0 \times 10^{-6}/°C$.

Embodiments of a present invention mismatched compression glass-to-metal seal have the components of a ferrule or casing/insulating glass/terminal lead of: 304L SS/Cabal-12/446 SS, 304L SS/Cabal-12/29-4-2 SS, 304L SS/Cabal-12/titanium alloy (grades 1 to 4, 5 and 9), 304L SS/TA-23/446 SS, 304L SS/TA-23/29-4-2 SS, 304L SS/TA-23/titanium alloy (grades 1 to 4, 5 and 9), and titanium alloy/Cabal-12/titanium alloy (grades 1 to 4, 5 and 9). Cabal-12 glass is commercially available from Sandia National Laboratories. Specific embodiments have the coefficient of thermal expansion combinations shown in Tables 1 to 5.

TABLE 1

| Ferrule or Casing Body | Insulating Glass | Terminal Lead |
|---|---|---|
| 304L SS $19 \times 10^{-6}/°C$. (20–600° C.) | Cabal-12 $6.5 \times 10^{-6}/°C$. (20–500° C.) | 446 SS $11.7 \times 10^{-6}/°C$. (20–600° C.) |
| 304L SS $19 \times 10^{-6}/°C$. (20–600° C.) | Cabal-12 $6.5 \times 10^{-6}/°C$. (20–500° C.) | 29-4-2 $9.4 \times 10^{-6}/°C$. (21–100° C.) |
| 304L SS $19 \times 10^{-6}/°C$. (20–600° C.) | Cabal-12 $6.5 \times 10^{-6}/°C$. (20–500° C.) | Titanium Alloy (Gr. 1–Gr. 4) $9.7 \times 10^{-6}/°C$. (20–540° C.) |

TABLE 1-continued

| Ferrule or Casing Body | Insulating Glass | Terminal Lead |
|---|---|---|
| 304L SS $19 \times 10^{-6}/°C$. (20–600° C.) | Cabal-12 $6.5 \times 10^{-6}/°C$. (20–500° C.) | Titanium Alloy (Gr. 5) $9.5 \times 10^{-6}/°C$. (20–540° C.) |
| 304L SS $19 \times 10^{-6}/°C$. (20–600° C.) | Cabal-12 $6.5 \times 10^{-6}/°C$. (20–500° C.) | Titanium Alloy (Gr. 9) $10.8 \times 10^{-6}/°C$. (20–540° C.) |

TABLE 2

| Ferrule or Casing Body | Insulating Glass | Terminal Lead |
|---|---|---|
| 304L SS $19 \times 10^{-6}/°C$. (20–600° C.) | TA-23 $6.3 \times 10^{-6}/°C$. (20–695° C.) | 446 SS $11.7 \times 10^{-6}/°C$. (20–600° C.) |
| 304L SS $19 \times 10^{-6}/°C$. (20–600° C.) | TA-23 $6.3 \times 10^{-6}/°C$. (20–695° C.) | 29-4-2 $9.4 \times 10^{-6}/°C$. (21–100° C.) |
| 304L SS $19 \times 10^{-6}/°C$. (20–600° C.) | TA-23 $6.3 \times 10^{-6}/°C$. (20–695° C.) | Titanium Alloy (Gr. 1–Gr. 4) $9.7 \times 10^{-6}/°C$. (20–540° C.) |
| 304L SS $19 \times 10^{-6}/°C$. (20–600° C.) | TA-23 $6.3 \times 10^{-6}/°C$. (20–695° C.) | Titanium Alloy (Gr. 5) $9.5 \times 10^{-6}/°C$. (20–540° C.) |
| 304L SS $19 \times 10^{-6}/°C$. (20–600° C.) | TA-23 $6.3 \times 10^{-6}/°C$. (20–695° C.) | Titanium Alloy (Gr. 9) $10.8 \times 10^{-6}/°C$. (20–540° C.) |

TABLE 3

| Ferrule or Casing Body | Insulating Glass | Terminal Lead |
|---|---|---|
| Titanium Alloy (Gr. 1–Gr. 4) $9.7 \times 10^{-6}/°C$. (20–540° C.) | Cabal-12 $6.5 \times 10^{-6}/°C$. (20–500° C.) | Titanium Alloy (Gr. 1–Gr. 4) $9.7 \times 10^{-6}/°C$. (20–540° C.) |
| Titanium Alloy (Gr. 1–Gr. 4) $9.7 \times 10^{-6}/°C$. (20–540° C.) | Cabal-12 $6.5 \times 10^{-6}/°C$. (20–500° C.) | Titanium Alloy (Gr. 5) $9.5 \times 10^{-6}/°C$. (20–540° C.) |
| Titanium Alloy (Gr. 1–Gr. 4) $9.7 \times 10^{-6}/°C$. (20–540° C.) | Cabal-12 $6.5 \times 10^{-6}/°C$. (20–500° C.) | Titanium Alloy (Gr. 9) $10.8 \times 10^{-6}/°C$. (20–540° C.) |

TABLE 4

| Ferrule or Casing Body | Insulating Glass | Terminal Lead |
|---|---|---|
| Titanium Alloy (Gr. 5) $9.5 \times 10^{-6}/°C$. (20–540° C.) | Cabal-12 $6.5 \times 10^{-6}/°C$. (20–500° C.) | Titanium Alloy (Gr. 1–Gr. 4) $9.7 \times 10^{-6}/°C$. (20–540° C.) |
| Titanium Alloy (Gr. 5) $9.5 \times 10^{-6}/°C$. (20–540° C.) | Cabal-12 $6.5 \times 10^{-6}/°C$. (20–500° C.) | Titanium Alloy (Gr. 5) $9.5 \times 10^{-6}/°C$. (20–540° C.) |
| Titanium Alloy (Gr. 5) $9.5 \times 10^{-6}/°C$. (20–540° C.) | Cabal-12 $6.5 \times 10^{-6}/°C$. (20–500° C.) | Titanium Alloy (Gr. 9) $10.8 \times 10^{-6}/°C$. (20–540° C.) |

TABLE 5

| Ferrule or Casing Body | Insulating Glass | Terminal Lead |
|---|---|---|
| Titanium Alloy (Gr. 9) $10.8 \times 10^{-6}/°$ C. (20–540° C.) | Cabal-12 $6.5 \times 10^{-6}/°$ C. (20–500° C.) | Titanium Alloy (Gr. 1–Gr. 4) $9.7 \times 10^{-6}/°$ C. (20–540° C.) |
| Titanium Alloy (Gr. 9) $10.8 \times 10^{-6}/°$ C. (20–540° C.) | Cabal-12 $6.5 \times 10^{-6}/°$ C. (20–500° C.) | Titanium Alloy (Gr. 5) $9.5 \times 10^{-6}/°$ C. (20–540° C.) |
| Titanium Alloy (Gr. 9) $10.8 \times 10^{-6}/°$ C. (20–540° C.) | Cabal-12 $6.5 \times 10^{-6}/°$ C. (20–500° C.) | Titanium Alloy (Gr. 9) $10.8 \times 10^{-6}/°$ C. (20–540° C.) |

By way of example, in an illustrative cell according to the present invention, the anode active material is an alkali metal selected from Group IA of the Periodic Table of Elements and contacted to a nickel current collector, and the cathode active material is of a carbonaceous material, fluorinated carbon, metal, metal oxide, mixed metal oxide or a metal sulfide, and mixtures thereof. Preferably, the cathode material is mixed with a conductive diluent such as carbon black, graphite or acetylene black or metal powders such as nickel, aluminum, titanium and stainless steel, and with a fluoro-resin powder binder material such as powdered polytetrafluroethylene or powdered polyvinylidene fluoride. The thusly prepared cathode active mixture is contacted to the cathode current collector which is a thin sheet or metal screen, for example, a titanium, stainless steel, aluminum or nickel screen.

The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include woven and non-woven fabrics of polyolefinic fibers or fluoropolymeric fibers including polyvylidene fluoride, polyethylenetetrafluoroethylene, and polyethylenechlorotrifluoroethylene laminated or superposed with a polyolefinic or fluoropolymeric microporous film. Suitable microporous films include a polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.). The separator may also be composed of non-woven glass, glass fiber materials and ceramic materials.

The exemplary cell of the present invention having the mismatched compression glass-to-metal seal is activated with an tonically conductive electrolyte which serves as a medium for migration of ions between the anode and the cathode electrodes during the electrochemical reactions of the cell. By way of example, a suitable electrolyte for an alkali metal active anode has an inorganic or organic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The ionically conductive salt serves as the vehicle for migration of the anode ions to intercalate or react with the cathode active material. Preferably the ion-forming alkali metal salt is similar to the alkali metal comprising the anode.

A preferred material for the casing is titanium although stainless steel, mild steel, nickel-plated mild steel and aluminum are also suitable. The casing header comprises a metallic lid having a sufficient number of openings to accommodate the glass-to-metal seal 10, 20 having the terminal lead 18, 22 connected to the cathode electrode. An additional opening is provided for electrolyte filling. The casing lid comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

Further, the cell of the present invention having the mismatched compression glass-to-metal seal 10, 20 is readily adaptable to secondary, rechargeable electrochemical chemistries. A typical negative electrode for a secondary cell is fabricated by mixing about 90 to 97 weight percent "hairy carbon" (U.S. Pat. No. 5,443,928 to Takeuchi et al.) or graphite with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This negative electrode admixture is provided on a current collector such as of a nickel, stainless steel, or copper foil or screen by casting, pressing, rolling or otherwise contacting the admixture thereto.

In secondary cells, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCO_{0.92}SnO_{0.08}O_2$ and $LiCo_{1-x}Ni_xO_2$. The secondary cell chemistry is activated by the previously described electrolytes.

To charge such secondary cells, the lithium metal comprising the positive electrode is intercalated into the carbonaceous negative electrode by applying an externally generated electrical potential to the cell. The applied recharging electrical potential serves to draw lithium ions from the cathode active material, through the electrolyte and into the carbonaceous material of the negative electrode to saturate the carbon. The resulting $Li_xC_6$ negative electrode can have an x ranging between 0.1 and 1.0. The cell is then provided with an electrical potential and is discharged in a normal manner.

It is appreciated that various modifications to the invention concepts described herein may be apparent to those skilled in the art without departing from the spirit and the scope of the present invention defined by the hereinafter appended claims.

What is claimed is:

1. An electrochemical cell comprising an anode electrode and a cathode electrode housed inside a casing and activated with an electrolyte, wherein one of the anode electrode and the cathode electrode is connected to a terminal lead insulated from the casing by a glass-to-metal seal, the improvement is the glass-to-metal seal comprising:

the glass-to-metal seal having an insulating glass extending between and sealed to a support portion of the casing and the terminal lead, wherein the insulating glass has a first coefficient of thermal expansion that ranges from about $6.3 \times 10^{-6}/°$ C. to about $6.5 \times 10^{-6}/°$ C., the terminal lead has a second coefficient of thermal expansion that ranges from about $9.4 \times 10^{-6}/°$ C. to about $11.7 \times 10^{-6}/°$ C. and the casing support portion has a third coefficient of thermal expansion that ranges from about 9.5×10$^{-6}$/° C. to about 19×10$^{-6}$/° C.

2. The electrochemical cell of claim 1 wherein second coefficient of thermal expansion and the third coefficient of thermal expansion differ by less than about 2.0×10$^{-6}$/° C.

3. The electrochemical cell of claim 1 wherein the second coefficient of thermal expansion and the third coefficient of thermal expansion differ by more than about 2.0×10$^{-6}$/° C.

4. The electrochemical cell of claim 1 wherein the first coefficient of thermal expansion is about 6.5×10$^{-6}$/° C., the second coefficient of thermal expansion is about 11.7×10$^{-6}$/° C. and the third coefficient of thermal expansion is about 19×10$^{-6}$/° C.

5. The electrochemical cell of claim 1 wherein the first coefficient of thermal expansion is about 6.5×10$^{-6}$/° C., the second coefficient of thermal expansion is about 9.4×10$^{-6}$/° C. and the third coefficient of thermal expansion is about 19×10$^{-6}$/° C.

6. The electrochemical cell of claim 1 wherein the first coefficient of thermal expansion is about 6.5×10$^{-6}$/° C., the second coefficient of thermal expansion is about 9.7×10$^{-6}$/° C. and the third coefficient of thermal expansion is about 19×10$^{-6}$/° C.

7. The electrochemical cell of claim 1 wherein the first coefficient of thermal expansion is about 6.5×10$^{-6}$/° C., the second coefficient of thermal expansion is about 9.5×10$^{-6}$/° C. and the third coefficient of thermal expansion is about 19×10$^{-6}$/° C.

8. The electrochemical cell of claim 1 wherein the first coefficient of thermal expansion is about 6.5×10$^{-6}$/° C., the second coefficient of thermal expansion is about 10.8×10$^{-6}$/° C. and the third coefficient of thermal expansion is about 19×10$^{-6}$/° C.

9. The electrochemical cell of claim 1 wherein the first coefficient of thermal expansion is about 6.3×10$^{-6}$/° C., the second coefficient of thermal expansion is about 11.7×10$^{-6}$/° C. and the third coefficient of thermal expansion is about 19×10$^{-6}$/° C.

10. The electrochemical cell of claim 1 wherein the first coefficient of thermal expansion is about 6.3×10$^{-6}$/° C., the second coefficient of thermal expansion is about 9.4×10$^{-6}$/° C. and the third coefficient of thermal expansion is about 19×10$^{-6}$/° C.

11. The electrochemical cell of claim 1 wherein the first coefficient of thermal expansion is about 6.3×10$^{-6}$/° C., the second coefficient of thermal expansion is about 9.7×10$^{-6}$/° C. and the third coefficient of thermal expansion is about 19×10$^{-6}$/° C.

12. The electrochemical cell of claim 1 wherein the first coefficient of thermal expansion is about 6.3×10$^{-6}$/° C., the second coefficient of thermal expansion is about 9.5×10$^{-6}$/° C. and the third coefficient of thermal expansion is about 19×10$^{-6}$/° C.

13. The electrochemical cell of claim 1 wherein the first coefficient of thermal expansion is about 6.3×10$^{-6}$/° C., the second coefficient of thermal expansion is about 10.8×10$^{-6}$/° C. and the third coefficient of thermal expansion is about 19×10$^{-6}$/° C.

14. The electrochemical cell of claim 1 wherein the first coefficient of thermal expansion is about 6.5×10$^{-6}$/° C., the second coefficient of thermal expansion is about 9.7×10$^{-6}$/° C. and the third coefficient of thermal expansion is about 9.7×10$^{-6}$/° C.

15. The electrochemical cell of claim 1 wherein the first coefficient of thermal expansion is about 6.5×10$^{-6}$/° C., the second coefficient of thermal expansion is about 9.5×10$^{-6}$/° C. and the third coefficient of thermal expansion is about 9.7×10$^{-6}$/° C.

16. The electrochemical cell of claim 1 wherein the first coefficient of thermal expansion is about 6.5×10$^{-6}$/° C., the second coefficient of thermal expansion is about 10.8×10$^{-6}$/° C. and the third coefficient of thermal expansion is about 9.7×10$^{-6}$/° C.

17. The electrochemical cell of claim 1 wherein the first coefficient of thermal expansion is about 6.5×10$^{-6}$/° C., the second coefficient of thermal expansion is about 9.7×10$^{-6}$/° C. and the third coefficient of thermal expansion is about 9.5×10$^{-6}$/° C.

18. The electrochemical cell of claim 1 wherein the first coefficient of thermal expansion is about 6.5×10$^{-6}$/° C., the second coefficient of thermal expansion is about 9.5×10$^{-6}$/° C. and the third coefficient of thermal expansion is about 9.5×10$^{-6}$/° C.

19. The electrochemical cell of claim 1 wherein the first coefficient of thermal expansion is about 6.5×10$^{-6}$/° C., the second coefficient of thermal expansion is about 10.8×10$^{-6}$/° C. and the third coefficient of thermal expansion is about 9.5×10$^{-6}$/° C.

20. The electrochemical cell of claim 1 wherein the first coefficient of thermal expansion is about 6.5×10$^{-6}$/° C., the second coefficient of thermal expansion is about 9.7×10$^{-6}$/° C. and the third coefficient of thermal expansion is about 10.8×10$^{-6}$/° C.

21. The electrochemical cell of claim 1 wherein the first coefficient of thermal expansion is about 6.5×10$^{-6}$/° C., the second coefficient of thermal expansion is about 9.5×10$^{-6}$/° C. and the third coefficient of thermal expansion is about 10.8×10$^{-6}$/° C.

22. The electrochemical cell of claim 1 wherein the first coefficient of thermal expansion is about 6.5×10$^{-6}$/° C., the second coefficient of thermal expansion is about 10.8×10$^{-6}$/° C. and the third coefficient of thermal expansion is about 10.8×10$^{-6}$/° C.

23. A glass-to-metal seal, which comprises:
a) an insulating glass;
b) a terminal lead; and
c) a support, wherein the insulating glass extends between and seals to the terminal lead and the support surrounding the insulating glass, and wherein the insulating glass has a first coefficient of thermal expansion that ranges from about 6.3×10$^{-6}$/° C. to about 6.5×10$^{-6}$/° C., the terminal lead has a second coefficient of thermal expansion that ranges from about 9.4×10$^{-6}$/° C. to about 11.7×10$^{-6}$/° C. and the support has a third coefficient of thermal expansion that ranges from about 9.5×10$^{-6}$/° C. to about 19×10$^{-6}$/° C.

24. The glass-to-metal seal of claim 23 wherein second coefficient of thermal expansion and the third coefficient of thermal expansion differ by less than about 2.0×10$^{-6}$/° C.

25. The glass-to-metal seal of claim 23 wherein second coefficient of thermal expansion and the third coefficient of thermal expansion differ by more than about 2.0×10$^{-6}$/° C.

26. A method for providing an electrochemical cell comprising the steps of:
a) providing an anode electrode and a cathode electrode in electrical association with each other housed inside a casing and activated with an electrolyte;
b) connecting one of the anode electrode and the cathode electrode to a terminal lead;
c) connecting the other of the anode electrode and the cathode electrode to the casing;
d) electrically segregating the terminal lead from the casing by the provision of an insulating glass extending between and sealing to the casing and the terminal lead, wherein the insulating glass has a first coefficient of thermal expansion that ranges from about 6.3×10$^{-6}$/° C. to about 6.5×10$^{-6}$/° C., the terminal lead has a second coefficient of thermal expansion that ranges from about 9.4×10$^{-6}$/° C. to about 11.7×10$^{-6}$/° C. and the casing has a third coefficient of thermal expansion that ranges from about 9.5×10$^{-6}$/° C. to about 19×10$^{-6}$/° C.

27. The method of claim 26 including providing the second coefficient of thermal expansion and the third coefficient of thermal expansion differing by less than about $2.0 \times 10^{-6}/°C$.

28. The method of claim 26 including providing the second coefficient of thermal expansion and the third coefficient of thermal expansion differing by more than about $2.0 \times 10^{-6}/°C$.

29. The electrochemical cell of claim 1 of either a primary or a secondary chemistry.

30. The electrochemical cell of claim 1 of a primary chemistry having the anode electrode of an alkali metal and the cathode electrode of a cathode active material selected from the group consisting of a carbonaceous material, a fluorinated carbon, a metal, a metal oxide, a mixed metal oxide, a metal sulfide, and mixtures thereof.

31. The electrochemical cell of claim 1 of a secondary chemistry having the anode electrode of carbon or graphite and the cathode electrode of a cathode active material selected from the group consisting of $LiNiO_2$, $LiMn_2O_4$, $LiCoO_2$, $LiCo_{0.92}Sn_{0.08}O_2$ and $LiCo_{1-x}Ni_xO_2$.

32. The electrochemical cell of claim 1 wherein the casing is selected from the group consisting of titanium, stainless steel, mild steel, nickel-plated mild steel, and aluminum.

* * * * *